(12) United States Patent
Begun et al.

(10) Patent No.: US 11,960,832 B2
(45) Date of Patent: Apr. 16, 2024

(54) CROSS-DOCUMENT INTELLIGENT AUTHORING AND PROCESSING, WITH ARBITRATION FOR SEMANTICALLY-ANNOTATED DOCUMENTS

(71) Applicant: Docugami, Inc., Kirkland, WA (US)

(72) Inventors: Andrew Paul Begun, Redmond, WA (US); Steven DeRose, Silver Spring, MD (US); Taqi Jaffri, Kirkland, WA (US); Luis Marti Orosa, Las Condes (CL); Michael B. Palmer, Edmonds, WA (US); Jean Paoli, Kirkland, WA (US); Christina Pavlopoulou, Emeryville, CA (US); Elena Pricoiu, Issaquah, WA (US); Swagatika Sarangi, Bellevue, WA (US); Marcin Sawicki, Kirkland, WA (US); Manar Shehadeh, Kirkland, WA (US); Michael Taron, Seattle, WA (US); Bhaven Toprani, Cupertino, CA (US); Zubin Rustom Wadia, Chappaqua, NY (US); David Watson, Seattle, WA (US); Eric White, San Luis Obispo, CA (US); Joshua Yongshin Fan, Bellevue, WA (US); Kush Gupta, Seattle, WA (US); Andrew Minh Hoang, Olympia, WA (US); Zhanlin Liu, Seattle, WA (US); Jerome George Paliakkara, Seattle, WA (US); Zhaofeng Wu, Seattle, WA (US); Yue Zhang, St Paul, MN (US); Xiaoquan Zhou, Bellevue, WA (US)

(73) Assignee: Docugami, Inc., Kirkland, WA (US)

( * ) Notice: Subject to any disclaimer, the term of this patent is extended or adjusted under 35 U.S.C. 154(b) by 0 days.

(21) Appl. No.: 17/724,934

(22) Filed: Apr. 20, 2022

(65) Prior Publication Data

US 2022/0245335 A1    Aug. 4, 2022

Related U.S. Application Data

(63) Continuation of application No. 16/986,136, filed on Aug. 5, 2020, now Pat. No. 11,392,763, which is a
(Continued)

(51) Int. Cl.
*G06F 40/186* (2020.01)
*G06F 16/2457* (2019.01)
(Continued)

(52) U.S. Cl.
CPC ........ *G06F 40/186* (2020.01); *G06F 16/2457* (2019.01); *G06F 16/248* (2019.01);
(Continued)

(58) Field of Classification Search
CPC ..... G06F 40/117; G06F 40/106; G06F 40/169
See application file for complete search history.

(56) References Cited

U.S. PATENT DOCUMENTS 6,246,977 B1   6/2001   Messerly et al.
7,257,772 B1   8/2007   Jones et al.
(Continued)

FOREIGN PATENT DOCUMENTS

CA    2431667 A1    12/2003
EP    1515241 A2    3/2005
(Continued)

OTHER PUBLICATIONS

American National Corpus Project, "Gate Tools: Using Gate," Date Unknown, four pages, [Online] [Retrieved on Jul. 16, 2020] Retrieved from the Internet <URL: http://www.anc.org/software/gate-tools/using-gate/>.
(Continued)

*Primary Examiner* — Asher D Kells
(74) *Attorney, Agent, or Firm* — Fenwick & West LLP

(57) ABSTRACT

Machine learning, artificial intelligence, and other computer-implemented methods are used to identify various
(Continued)

semantically important chunks in documents, automatically label them with appropriate datatypes and semantic roles, and use this enhanced information to assist authors and to support downstream processes. Chunk locations, datatypes, and semantic roles can often be automatically determined from what is here called "context", to wit, the combination of their formatting, structure, and content; those of adjacent or nearby content; overall patterns of occurrence in a document, and similarities of all these things across documents (mainly but not exclusively among documents in the same document set). Similarity is not limited to exact or fuzzy string or property comparisons, but may include similarity of natural language grammatical structure, ML (machine learning) techniques such as measuring similarity of word, chunk, and other embeddings, and the datatypes and semantic roles of previously-identified chunks.

20 Claims, 5 Drawing Sheets

Related U.S. Application Data continuation of application No. PCT/US2020/043606, filed on Jul. 24, 2020.

(60) Provisional application No. 62/900,793, filed on Sep. 16, 2019.

(51) Int. Cl.
| | |
|---|---|
| *G06F 16/248* | (2019.01) |
| *G06F 16/93* | (2019.01) |
| *G06F 40/106* | (2020.01) |
| *G06F 40/117* | (2020.01) |
| *G06F 40/169* | (2020.01) |
| *G06F 40/289* | (2020.01) |
| *G06F 40/295* | (2020.01) |
| *G06F 40/30* | (2020.01) |
| *G06N 20/00* | (2019.01) |
| *G06V 30/414* | (2022.01) |
| *G06V 30/416* | (2022.01) |

(52) U.S. Cl.
CPC ............ *G06F 16/93* (2019.01); *G06F 40/106* (2020.01); *G06F 40/117* (2020.01); *G06F 40/169* (2020.01); *G06F 40/289* (2020.01); *G06F 40/295* (2020.01); *G06F 40/30* (2020.01); *G06N 20/00* (2019.01); *G06V 30/414* (2022.01); *G06V 30/416* (2022.01)

(56) References Cited

U.S. PATENT DOCUMENTS

| | | | |
|---|---|---|---|
| 7,287,219 B1 | 10/2007 | Young et al. | |
| 7,571,169 B2 | 8/2009 | Jones et al. | |
| 7,778,953 B2 | 8/2010 | Fujiwara | |
| 7,912,705 B2 | 3/2011 | Wasson et al. | |
| 8,180,633 B2 | 5/2012 | Collobert et al. | |
| 8,209,278 B1 | 6/2012 | Straus | |
| 8,214,734 B2 | 7/2012 | Grabarnik et al. | |
| 8,249,344 B2 | 8/2012 | Viola et al. | |
| 8,261,186 B2 | 9/2012 | Mansfield et al. | |
| 8,543,577 B1 | 9/2013 | Ben-Artzi et al. | |
| 8,671,341 B1 | 3/2014 | Hellwig et al. | |
| 8,818,932 B2 | 8/2014 | Nolan et al. | |
| 9,262,395 B1 | 2/2016 | Zhang et al. | |
| 9,514,499 B1 | 12/2016 | Kogut-O'Connell et al. | |
| 9,594,730 B2 | 3/2017 | Rajan et al. | |
| 9,760,634 B1 | 9/2017 | Joshi et al. | |
| 9,880,988 B2* | 1/2018 | Vanderwende | ....... G06F 40/279 |
| 10,489,441 B1 | 11/2019 | Joshi et al. | |
| 10,614,345 B1 | 4/2020 | Tecuci et al. | |
| 10,817,655 B2 | 10/2020 | Knudson et al. | |
| 11,636,354 B1 | 4/2023 | Podgorny et al. | |
| 2002/0002481 A1 | 1/2002 | Uchio et al. | |
| 2002/0026456 A1 | 2/2002 | Bradford | |
| 2003/0130837 A1 | 7/2003 | Batchilo et al. | |
| 2005/0027664 A1 | 2/2005 | Johnson et al. | |
| 2005/0060140 A1 | 3/2005 | Maddox | |
| 2005/0060643 A1* | 3/2005 | Glass | ................... H04L 51/212 |
| | | | 715/205 |
| 2005/0108630 A1 | 5/2005 | Wasson et al. | |
| 2006/0041424 A1 | 2/2006 | Todhunter et al. | |
| 2006/0080101 A1 | 4/2006 | Chotimongkol et al. | |
| 2006/0235870 A1 | 10/2006 | Musgrove | |
| 2007/0136221 A1 | 6/2007 | Sweeney et al. | |
| 2007/0150802 A1 | 6/2007 | Wan et al. | |
| 2007/0208996 A1 | 9/2007 | Berkner et al. | |
| 2008/0097951 A1 | 4/2008 | Gupta et al. | |
| 2008/0147790 A1 | 6/2008 | Malaney et al. | |
| 2008/0319735 A1 | 12/2008 | Kambhatla et al. | |
| 2009/0049018 A1 | 2/2009 | Gross | |
| 2009/0063473 A1 | 3/2009 | Van Den Berg et al. | |
| 2009/0204605 A1 | 8/2009 | Bai et al. | |
| 2009/0216735 A1 | 8/2009 | Dexter et al. | |
| 2010/0088676 A1 | 4/2010 | Yuan et al. | |
| 2010/0153318 A1 | 6/2010 | Branavan et al. | |
| 2010/0195909 A1 | 8/2010 | Wasson et al. | |
| 2010/0228693 A1 | 9/2010 | Dawson et al. | |
| 2010/0268700 A1 | 10/2010 | Wissner et al. | |
| 2011/0202530 A1 | 8/2011 | Saito | |
| 2011/0264640 A1 | 10/2011 | Fontoura et al. | |
| 2011/0276874 A1 | 11/2011 | Dejean | |
| 2012/0005686 A1 | 1/2012 | Rajan et al. | |
| 2012/0072859 A1 | 3/2012 | Wang et al. | |
| 2012/0179718 A1 | 7/2012 | Matsumoto | |
| 2012/0296637 A1 | 11/2012 | Smiley et al. | |
| 2013/0013591 A1 | 1/2013 | Hu et al. | |
| 2013/0021346 A1 | 1/2013 | Terman | |
| 2013/0024183 A1 | 1/2013 | Gardie et al. | |
| 2013/0041652 A1 | 2/2013 | Zuev et al. | |
| 2013/0067319 A1 | 3/2013 | Olszewski et al. | |
| 2013/0343658 A1 | 12/2013 | Déjean | |
| 2014/0039877 A1 | 2/2014 | Guenigault et al. | |
| 2014/0245122 A1 | 8/2014 | Oro et al. | |
| 2014/0324808 A1* | 10/2014 | Sandhu | .................... G06F 16/31 |
| | | | 707/706 |
| 2015/0039651 A1 | 2/2015 | Kinsely et al. | |
| 2015/0088888 A1* | 3/2015 | Brennan | ........... G06F 16/24578 |
| | | | 707/737 |
| 2015/0089399 A1 | 3/2015 | Megill et al. | |
| 2015/0112664 A1 | 4/2015 | Srinivasan | |
| 2015/0134321 A1 | 5/2015 | Fennell | |
| 2015/0139610 A1 | 5/2015 | Syed et al. | |
| 2015/0178853 A1 | 6/2015 | Byron et al. | |
| 2015/0261743 A1 | 9/2015 | Sengupta et al. | |
| 2015/0278200 A1 | 10/2015 | He et al. | |
| 2016/0070693 A1 | 3/2016 | Carrier et al. | |
| 2016/0189300 A1 | 6/2016 | Byron et al. | |
| 2016/0224516 A1 | 8/2016 | Clar et al. | |
| 2016/0232204 A1* | 8/2016 | Zholudev | .............. G06F 40/117 |
| 2016/0267165 A1 | 9/2016 | Wang | |
| 2017/0147910 A1 | 5/2017 | Mao et al. | |
| 2017/0329757 A1 | 11/2017 | Knudson et al. | |
| 2018/0081608 A1 | 3/2018 | Tamura | |
| 2018/0082183 A1 | 3/2018 | Hertz et al. | |
| 2018/0150768 A1 | 5/2018 | Togia et al. | |
| 2018/0232340 A1 | 8/2018 | Lee | |
| 2018/0268506 A1 | 9/2018 | Wodetzki et al. | |
| 2018/0300315 A1 | 10/2018 | Leal et al. | |
| 2018/0349342 A1 | 12/2018 | Bull et al. | |
| 2019/0095420 A1 | 3/2019 | Galitsky | |
| 2019/0102375 A1 | 4/2019 | Goulikar et al. | |
| 2019/0102697 A1 | 4/2019 | Casalonga et al. | |
| 2019/0286741 A1 | 9/2019 | Agarwal et al. | |
| 2019/0377779 A1 | 12/2019 | Gelosi | |
| 2020/0004870 A1 | 1/2020 | Dulam | |

(56) References Cited

U.S. PATENT DOCUMENTS

| | | | |
|---|---|---|---|
| 2020/0175041 A1* | 6/2020 | Ramachandra ... | G06F 16/24578 |
| 2020/0311123 A1 | 10/2020 | Iver | |
| 2021/0081608 A1 | 3/2021 | Begun et al. | |

FOREIGN PATENT DOCUMENTS

| | | |
|---|---|---|
| EP | 2639749 A1 | 9/2013 |
| GB | 2517976 A | 3/2015 |
| WO | WO-9801807 A1 | 1/1998 |
| WO | WO-0065483 A2 | 11/2000 |
| WO | WO-2008132706 A1 | 11/2008 |
| WO | WO-2009029923 A2 | 3/2009 |
| WO | WO-2014000130 A1 | 1/2014 |
| WO | WO-2015092955 A1 | 6/2015 |
| WO | WO-2021055102 A1 | 3/2021 |

OTHER PUBLICATIONS

Barabucci, G. et al., "Embedding semantic annotations within texts: The FRETTA approach," SAC'12 Mar. 25-29, 2012, pp. 1-6.

Brugger, R. et al., "A DTD Extension for Document Structure Recognition," Lecture Notes in Computer Science book series (LNCS, vol. 1375), May 22, 2006, pp. 1-12.

Coombs, J.H. et al., "Markup Systems and the Future of Scholarly Text Processing," Communications of the ACM, vol. 30, No. 11, Nov. 1987, pp. 933-947.

Derose, S., "Markup Overlap: A Review and a Horse," Extreme Markup Languages 2004, Aug. 2004, pp. 1-17.

Derose, S.J et al., "What is Text, Really?," Journal of Computing in Higher Education, vol. 1(2), Dec. 1990, pp. 3-26.

Dzuba, V., "MAJIX 1.0: A Word to XML Converter," Oct. 6, 1998, two pages, [Online] [Retrieved on Jul. 17, 2020] Retrieved from the Internet <URL: http://xml.coverpages.org/majix10Ann.html>.

Electronic Book Technologies, "Electronic Book Technologies Announces Common Sgml Representation for Proprietary File Formats," Dec. 8, 1993, three pages, [Online] [Retrieved on Jul. 16, 2020] <URL: http://xml.coverpages.org/rainbowPR.html>.

Expert Advisory Group on Language Engineering Standards (Eagles), "Corpus Encoding Standard," Mar. 20, 2020, three pages, [Online] [Retrieved on Jul. 16, 2020] <URL: https://www.cs.vassar.edu/CES/CES1.html>.

Ishitani, Y., "Document Transformation System from Papers to XML Data Based on Pivot XML Document Method," Proceedings of the Seventh International Conference on Document Analysis and Recognition (ICDAR 2003), Aug. 2003, pp. 1-6.

Kenter, T. et al., "Using GATE as an Annotation Tool," Jul. 20, 2004, pp. 1-11.

Klink, S. et al., "Document Structure Analysis Based on Layout and Textual Features," Proc. of International Workshop on Document Analysis Systems, 2000, pp. 1-12.

Koivunen, M-R., "Annotea Project," Oct. 31, 2005, three pages, [Online] [Retrieved on Jul. 16, 2020] Retrieved from the Internet <URL: https://www.w3.org/2001/Annotea/>.

Lafferty, J. et al., "Document Language Models, Query Models, and Risk Minimization for Information Retrieval," SIGIR'01, Sep. 2001, pp. 1-9.

Lefevre, P. et al., "ODIL: an SGML description language of the layout structure of documents," ICDAR '95: Proceedings of the Third International Conference on Document Analysis and Recognition (vol. 1), Aug. 1995, pp. 480-488.

Murata, M., "File format for documents containing both logical structures and layout structures," Electronic Publishing, vol. 8(4), Dec. 1995, pp. 295-317.

Paaß, G. et al., "Machine Learning for Document Structure Recognition," Jun. 22, 2009, pp. 1-21.

PCT International Search Report and Written Opinion, PCT Application No. PCT/US20/43606, dated Nov. 23, 2020, 22 pages.

PCT Invitation to Pay Additional Fees, PCT Application No. PCT/US20/43606, dated Sep. 28, 2020, two pages.

Rahman, M. M. et al., "Understanding the Logical and Semantic Structure of Large Documents," arXiv:1709.00770, Sep. 3, 2017, pp. 1-10.

Renear, A. et al., "An Outline for a Functional Taxonomy of Annotation," Microsoft Research, Apr. 1999, pp. 1-30.

Ronnberg, K. et al., "Tesseract hOCR to produce xml, not (x)html, or a tool to simulate this, or a tool to collect the div (etc) attributes," Mar. 26, 2016, two pages, [Online] [Retrieved on Jul. 21, 2020] Retrieved from the Internet <URL: https://groups.google.com/forum/#!topic/tesseract-ocr/ilGo5hODTx8>.

Sanderson, R. et al., "Web Annotation Data Model," W3C Recommendation, Feb. 23, 2017, pp. 1-70, [Online] [Retrieved on Jul. 16, 2020] Retrieved from the Internet <URL: https://www.w3.org/TR/2017/REC-annotation-model-20170223/>.

Siddiqi, S. et al., "Keyword and Keyphrase Extraction Techniques: A Literature Review," International Journal of Computer Applications, vol. 109, No. 2, Jan. 2015, pp. 18-23.

Sklar, D., "The Annotated Rainbow DTD: Rainbow version 2.0," Jan. 10, 1994, pp. 1-10.

Spandorfer, A. et al., "Deep learning to convert unstructured CT pulmonary angiography reports into structured reports," European Radiology Experimental 3:37, Sep. 23, 2019, pp. 1-8.

United States Office Action, U.S. Appl. No. 16/986,142, dated Aug. 13, 2021, 36 pages.

United States Office Action, U.S. Appl. No. 16/986,139, dated Aug. 25, 2021, 21 pages.

United States Office Action, U.S. Appl. No. 16/986,151, dated Aug. 30, 2021, 13 pages.

United States Office Action, U.S. Appl. No. 16/986,139, dated Feb. 18, 2021, 19 pages.

Wissler, L. et al., "The Gold Standard in Corpus Annotation," IEEE GSC 2014, Jun. 2014, pp. 1-4.

Lang, J. et al., "Unsupervised induction of semantic roles." Human Language Technologies: The 2010 Annual Conference of the North American Chapter of the Association for Computational Linguistics, 2010, pp. 939-947.

Palmer, M. et al., "The Proposition Bank: An Annotated Corpus of Semantic Roles," Computational linguistics 31.1, 2005, pp. 71-106.

Soria, C. et al. "Automatic extraction of semantics in law documents," Proceedings of the V Legislative XML workshop, European Press Academic Publishing, 2007, pp. 253-266.

United States Office Action, U.S. Appl. No. 16/986,136, dated Jul. 14, 2021, 11 pages.

United States Office Action, U.S. Appl. No. 16/986,142, dated May 13, 2022, 37 pages.

United States Office Action, U.S. Appl. No. 16/986,146, dated Aug. 4, 2022, eight pages.

United States Office Action, U.S. Appl. No. 16/986,151, dated Nov. 23, 2022, 13 pages.

United States Office Action, U.S. Appl. No. 16/986,139, dated Nov. 30, 2022, 26 pages.

Canadian Intellectual Property Office, Office Action, CA Application No. 3,150,535, Oct. 18, 2023, 12 pages.

Korea Intellectual Property Office, Office Action, KR Application No. 10-2022-7011501, Sep. 19, 2023, 9 pages.

* cited by examiner

CROSS-DOCUMENT INTELLIGENT AUTHORING AND PROCESSING, WITH ARBITRATION FOR SEMANTICALLY-ANNOTATED DOCUMENTS

CROSS-REFERENCE TO RELATED APPLICATION(S)

This application is a continuation of U.S. patent application Ser. No. 16/986,136, "Cross-Document Intelligent Authoring and Processing, Including Format for Semantically-Annotated Documents," filed Aug. 5, 2020; which is a continuation of PCT Application Serial No. PCT/US20/43606, "Cross-Document Intelligent Authoring and Processing Assistant," filed Jul. 24, 2020. U.S. patent application Ser. No. 16/986,136 also claims priority under 35 U.S.C. § 119(e) to U.S. Provisional Patent Application Ser. No. 62/900,793, "Cross-Document Intelligent Authoring and Processing Assistant," filed Sep. 16, 2019. The subject matter of all of the foregoing is incorporated herein by reference in their entirety.

BACKGROUND

1. Technical Field

This disclosure relates generally to methods and apparatus for the AI self-supervised creation of hierarchically semantically labeled documents and/or for the assisted authoring and processing of such documents.

2. Description of Related Art

Many businesses create multiple documents that are quite similar even though they are customized each time. For example, an insurance office may produce many proposals for a particular kind of insurance, but each must be tailored to the particular customer's needs. These documents can be considered to be of the same "type," because they have similar text (and possibly image) content (reflecting similar purposes and topics), similar selections and arrangements of large units such as sections, and often even similar geometric layout and formatting characteristics.

Some types of documents are widely known and used, but many are not. Many are specific to a particular business, market, or application, and new ones are created for new situations. Users who may be called "authors" or "editors" commonly create new documents of a particular type (sometimes called "target documents") by copying an earlier document of the same type and then making changes as needed, for example by manually editing or replacing certain chunks of content.

In current practice, word processing identifies chunks typically only if needed to achieve formatting: for example, headings, footnotes, and figures may be explicitly marked in order to obtain special formatting; but names, addresses, or dates are rarely explicitly marked. Even when identified, chunks are commonly associated only with formatting effects (such as margins, fonts, and so on) which are useful information, but do not directly provide any indication of their datatypes or semantic roles. Similarly, word processors often represent hierarchical containment only visually: there is often no explicit representation of nested sections per se, but only of differently formatted headings.

When creating a new document of the same general kind as prior documents, in many cases the bulk of the work is text editing, replacement, removal, or insertion of certain chunks, being careful not to confuse ones that have different semantic roles (such as swapping buyer and seller addresses). This typically requires human intervention because authoring systems typically know nothing of these chunks, particularly their datatypes or semantic roles, and therefore cannot help very effectively.

In some simple cases, "forms" and "templates" may be used, providing explicit places to fill in content for particular chunks. However, forms typically address only simple cases, where substantially all the needed chunks can be enumerated ahead of time, and where there are few large, repeatable, or highly-structured chunks. Forms also require skilled effort to create, are difficult to adjust to changing circumstances, and do not actively assist the writer.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

Overview

Figure 1:
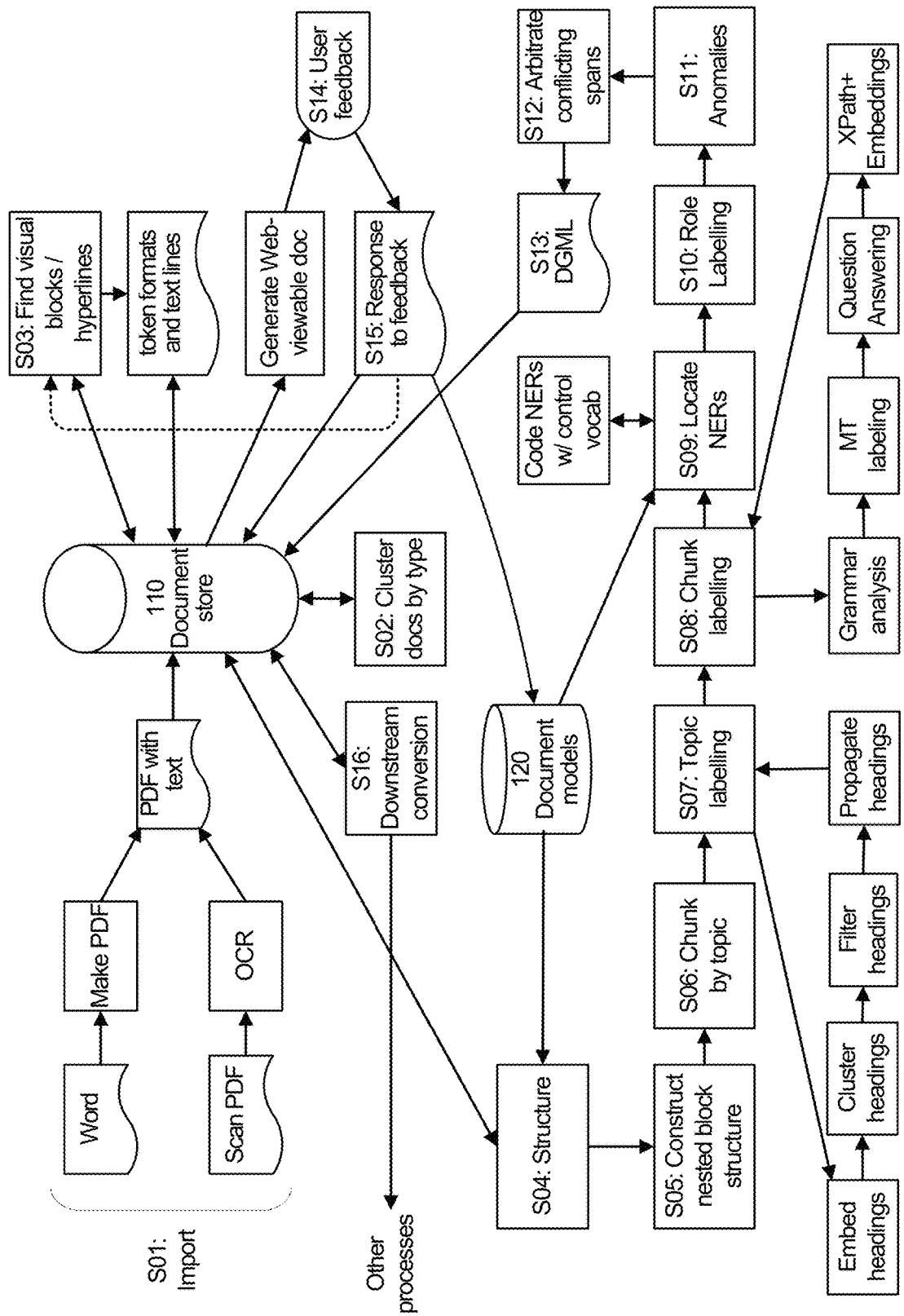
FIG. 1 is a block diagram of one implementation of a system and process for the creation of hierarchically semantically labeled documents using machine learning and artificial intelligence.

A group of documents that are determined to be of the same type, constitutes a "document set" or "document cluster". For example, an insurance company's proposals for a certain kind of insurance for a certain class of customers may be considered the same type and form a document set. The same company's proposals for a different kind of insurance, or proposals for customers they consider different, may be considered a different type belonging to a different document set. Rental agreements, clinical notes for a certain kind of patient, sales proposals, schedules, meeting minutes, etc. are other potential types of documents, as are sub-types that share distinctive patterns of content, structure, and/or layout.

The creation and editing of new target documents within a document set very often involves editing or replacing "chunks" that are "semantically-significant": such a chunk is a particular portion of a document, typically though not necessarily a contiguous span of text, that has a particular datatype and semantic role, and is of meaning and significance for a business or other process.

These chunks are of various datatypes, which are more fine-grained here than atomic datatypes in many computer systems. For example, a given chunk may represent not merely a string, but a personal or organizational name; a date; a duration of time (not at all the same thing as a date);

a currency amount. Larger chunks can include lists of drugs or other substances, itineraries, procedures to follow, bundles of information such as a medical prescription; and countless more.

In addition, chunks may have semantic roles in relation to the document in which they occur. For example, a personal name could be the "tenant" in a lease agreement, or the "seller" in a sales proposal, or the "agent" of another person. A date could represent the start or end of some responsibility or activity. A dollar amount could be a periodic payment amount, or a penalty or bonus related to certain conditions, etc. Such semantic roles are important to making proper use of the information in the chunks. Names for semantic roles are called "semantic role labels", or simply "labels".

A chunk is typically represented as a bundle including its location, datatype, semantic role, and/or other data/metadata. A location is commonly represented as a starting and ending point, which can be represented in several ways, such as inserted markers or byte, character, or token offsets (either global to a document, or relative to established IDs, markers, or other objects). Semantic roles are represented by a label or other identifier. Chunks can be of any size, and some can contain other chunks as "sub-chunks". Chunks can contain not only text, but also non-text data such as images or other media and "structures" such as tables, lists, sections, etc.

The technologies disclosed herein use machine learning, artificial intelligence, and other computer-implemented methods to identify various semantically important chunks in documents, automatically provide them with appropriate datatypes and semantic roles, and use this enhanced information to assist authors and to support downstream processes. Chunk locations, datatypes, and semantic roles can often be automatically determined from what is here called "context", to wit, the combination of their formatting, structure, and content; those of adjacent or nearby content; overall patterns of occurrence in a document; and similarities of all these things across documents (mainly but not exclusively among documents in the same document set). "Nearby content" includes content which is horizontally close, such as preceding and following in the reading sequence of text; but also vertically close, such as within the same container structures like lists and sections along with their respective markers, headings, levels, etc. Similarity is not limited to exact or fuzzy string or property comparisons, but may include similarity of natural language grammatical structure, ML (machine learning) techniques such as measuring similarity of word, chunk, and other embeddings, and the datatypes and semantic roles of previously-identified chunks.

For example, a personal or organizational name commonly can be identified as having a semantic role such as "seller" because the document says so, very often using a sentence(s) in some human language, but often also involving larger context. For another example, one or more words can often be identified as representing a datatype such as "medication name" easily; but context is required to determine that it carries the semantic role of an allergy rather than of a prescription. Often important evidence of a semantic role is not in the same sentence, but expressed in various other ways such as by the chunk occurring in a larger chunk (such as a "Known Allergies" section). The flexibility and variety of grammar and of document structural organization (not to mention typos, transcription errors, etc.) make identifying datatypes less difficult but identifying semantic roles, especially ones with scope greater than a single sentence, very difficult.

A given semantic role may relate a chunk to the document as a whole, or to other chunks. For example, the departure time of a flight is tied to one particular "leg" in an itinerary, and only indirectly related to others. Commonly, the hierarchical structure of chunks groups such items together appropriately, such as co-location within sections, table parts, etc.

In more detail, examples of semantically-significant chunks include the names, addresses, and other characteristics of particular parties to a contract; prescribed medications and proscribed procedures in medical records; requirements (or exclusions) in real estate proposals; dates and flight numbers in itineraries; and so on. These can all be considered semantic roles of chunks. There are also larger chunks with various types and roles, such as whole sections and subsections. These are often inserted or removed as wholes, perhaps also with smaller chunk changes within. Chunks may be hierarchical; that is, larger "containing" chunks may contain other "sub-chunks" to any number of levels.

A chunk is commonly a contiguous series of words in a document, such as "John Doe". However, chunks may include partial words. "John Doe's house" includes a name, but the name ends before the apostrophe (in mid-word). Chunks can even be discontinuous, for example the same name in "John (also known as 'Bill') Doe". Layout can also cause chunks to be discontinuous, for example a page break can occur in the middle of a chunk (perhaps with page headers, footers, or footnotes, which for some purposes may be ignored); an intervening figure, table, chart, sidebar, or other display; and so on.

The actual location and context of a chunk may also be important—a chunk is not merely an isolated string, which might occur many times with different (or no) semantic roles for different instances. More modern systems typically support inline or standoff markup, sometimes called "annotation", that can persistently associate various labels and other information with chunks. For example, HTML provides tags for manually labelling the boundaries of generic structure chunks ("div", "ol", etc.), and a few broad types or roles for (typically) smaller chunks ("acronym", "kbd", "dfn", "cite", etc.). Other XML schemas provide many other labels, and word processors permit somewhat similar labelling via "styles".

Some chunks may represent what are commonly called "fields." These are often small chunks, and often occur in similar contexts and layouts in many or all documents in a given set, but usually with different text content in each. They may also occur multiple times in a single document, with the same or very similar content. Such chunks may be called "field chunks". They are often manually discovered and treated as "fields" in template-based systems, but here they are discovered by their contexts and patterns of occurrence within and across documents, and are assigned datatypes and semantic roles in much the same way as other chunks. They may or may not represent Named Entities such as personal names, addresses, dates, etc.

Another common type of chunk may be called a "structure" or "structural" chunk. Such chunks are typically larger, and often contain many other chunks (some of which may also be structure chunks). They frequently have a "title" or "heading" that provides a name, number, description, and/or other information about the structure chunk. Examples of structure chunks include chapters, sections, tables, figures, sidebars, and many more. The types and semantic roles of structure chunks are often important for determining the types and semantic roles of nearby or contained chunks.

Not only datatypes, but also specific semantic roles, are important to properly composing and utilizing a document: It matters a great deal whether a certain name represents the buyer versus the seller, or the patient versus the doctor; whether a given date is the start or end of a requirement, or the departure vs. arrival time of a flight; whether a number specifies principal, interest, dosage, temperature, penalty, or something else. For larger chunks, roles include things like being the "limitations on liability" statement versus the "governing law" specification versus a "definition", and countless others. Chunks' semantic roles are often specific to particular domains or transactions and are arguably among the most important features of documents. In many kinds of documents, chunks with particular datatypes and semantic roles are required or at least very common, and chunks are called "counterparts" when they correspond across documents. Counterpart chunks may occur in similar orders and patterns, especially for documents by the same author or organization, and usually of the same document set. Counterpart chunks have the same or very similar roles, and commonly have similar context and/or formatting. Thus, the distribution of chunk datatypes and semantic roles provides valuable information to distinguish types of documents, as well as to help in identifying counterpart chunks in other documents.

Many counterpart chunks have similar content, but others do not. For example the same party (a semantic role) in different documents is usually a different individual, though appearing in very similar contexts and patterns of use. This may be especially common for, but is not exclusive to, "field chunks".

Once discovered, hierarchical semantic chunks with their datatypes and semantic roles in business documents may be used in downstream business processes. For example, a back-office database can record a new mortgage properly if it is given the specific parties' names, specific dates, and numbers such as the term and interest rate, etc. Particularly for such uses, semantic roles are extremely important: putting the right datatype into the wrong database field (such as swapping seller and buyer names or addresses) is a big problem, particularly when moving information to downstream databases, processes, or reports.

Some Features and Benefits

The technologies described herein may have various features and benefits, including any of the following.

Some implementations may provide an easier, more efficient, and more accurate way to produce documents with hierarchically organized chunks with semantic labelling that are useful for business processes. This may be accomplished using a variety of techniques to identify such chunks of various sizes, discover the datatypes and semantic roles they play in the document, and learn their patterns of use, characteristic contexts, etc. The learning may come from analysis of the content, structure, and formatting of current and prior documents; feedback from authors and editors; and comparison of multiple documents, especially ones in the same document set. With this knowledge, the system can provide valuable assistance to users, for example easier creation of higher-quality new documents, and extraction of desired information for downstream uses such as with other software applications, in back-office databases, derived reports, compliance checking, and so on. Such learning may be done with unsupervised and self-supervised learning techniques, which do not require large amounts of pre-labelled or pre-analyzed data, but instead infer patterns from unlabeled or minimally labeled data.

Some implementations may enable computers to assist in the writing process, by discovering and using patterns within and across a business's documents to help writers avoid many of these errors, and thus reduce the time required to achieve a given level of quality.

Today, typical document systems do not identify chunks, or particularly their datatypes or semantic roles. This adds time and expense for authors and editors, and to import the data from documents into back-end databases, dashboards, or other downstream business processes. For example, it is common to find and copy data manually (chunk by chunk) from contracts into spreadsheets or data-entry forms.

Some implementations may help label such hierarchical semantic chunks during the authoring process and represent them explicitly, thus making them easy for people and/or computers to extract and saving time and expense in connecting to other business processes of various kinds.

Current technology typically does not take full advantage of similarities between multiple documents created by the same writer or group, and/or of the same type (as indicated here by membership in a particular document set), to identify chunks more reliably in new documents or to flag likely-significant differences for attention. Explicit rules such as requiring a section headed "Severability", only cover similarities that analysts readily notice and describe; are static and often constraining (for example, missing cases with rephrasing or reorganization, or failing to respond to countervailing conditions); and quickly become obsolete. Small companies often lack the necessary resources to develop more responsive technology, and often have too few documents to justify the expense. On the other hand, smaller companies often have a less-diverse range of documents, that are more amenable to automated analysis such as described herein.

Some implementations may use extracted information about chunks and their patterns of content, context, layout, and use across documents, to assist writers in creating new documents. Examples include suggesting at least: specific content to change, reformat, or move; clauses that are missing in the new document though commonly present in similar documents (called "missing" or "possibly-omitted-"chunks or content); clauses that are present though commonly absent in similar documents (called "unusual" chunks or content); changes such as swapping the names or roles of different parties in particular places; and so on.

Some implementations may accept and retain user feedback, such as when a user indicates that a chunk has been labelled with an incorrect scope, datatype, or semantic role; is not of interest to them; or failed to be labeled at all. Some implementations may use specific user corrections to improve machine learning and neural models, as well as remembering not to repeat earlier suggestions in cases where the user has rejected them (even if the additional learning fails to prevent the particular instance of a mistake). In particular, some implementations may avoid requiring large numbers of review steps or corrections in favor of few-shot learning techniques and careful choice of what feedback to request, in order to minimize the amount of user action required. Some current technology learns very specific things, for example when a user tells a spelling-checker to add a word to its dictionary. However, this involves mere rote lists, not iterative training or fine-tuning of models which are used to determine sophisticated later behavior, and therefore does not fully exploit capabilities such as described herein.

Some implementations may use small numbers of user corrections to learn and improve their behavior, while avoiding annoying users with repeated suggestions when improved but still-imperfect models are re-applied.

Many businesses record specific information obtained from documents, in databases of various kinds that support their processes. For example, a company that owns many rental properties typically uses a back-end system to help manage not just renters' payments, but also specific information that originates in their rental agreements, such as approved pets, prior damage for which the renter is not responsible, or other information. Car or tool renters, mortgage companies, health care providers, municipalities, and other organizations use other information. Many goods and services have numerous mix-and-match options, and supervisors review statistics on their acceptance, combinations, pricing, and other factors. Business information systems commonly provide analysis, check consistency or compliance, derive reports, and/or support other business processes, all of which can be facilitated through use of the chunk information described herein.

Commonly, chunks and the information they provide are scattered throughout prose text, extracted manually, and entered manually into spreadsheets, databases, or other systems. Manual work has previously been required because important chunks can be expressed in countless varying ways because of the flexibility of the natural human languages in which agreements, emails, and the like are written, and similarly variable layout and representation conventions. Negotiations underlying such documents are often also scattered across multiple kinds of documents, including emails, notes from conversations, slide presentations, etc. That information may also be useful but is typically handled manually. Some systems may treat such information sources as documents, gaining the same benefits already described.

Some implementations may provide means for a computer to start executing a specific document once it has been transformed as described herein to become a hierarchically semantically labeled document. By combining the hierarchically labeled structure of the document with tools that provide vector-semantic representations of text, certain chunks can be identified as requiring certain actions. For example, a contract may specify money transfers, notifications, or other actions, and conditions that enable or trigger them. These can be identified and used to start to execute the contract.

Some implementations may provide easy ways to review and summarize information from document sets in interfaces such as "dashboards", and to move identified information into a customer's back-end databases or similar systems, enabling more efficient and less expensive business data flows and enhancing quality assurance, consistency, and reporting. Once chunks have been semantically labeled, it becomes easier to generate summary reports over sets of documents that contain counterpart chunks. Some implementation may provide very easy ways for users to create such reports, merely by clicking on one or more examples of chunks to be included, which are then located and extracted by role or context across all documents in a set. Some implementations may also assist the user in finding documents that lack expected counterpart chunks, and either correcting them to include or identify such chunks, or confirming that they correctly do not include them.

In another aspect, the performance for a given group such as a company or department can be enhanced by incorporating information such as chunk semantic roles, patterns of occurrence, and other characteristics of their documents and their users' feedback into the system's learning processes, and using the resulting improved models to enhance and/or check future documents. However, many customers do not want such information shared with other customers, and many have binding confidentiality requirements. On the other hand, general information and learning derived from public, non-confidential sources can be used and shared freely.

Some implementations may provide the benefits of feedback and learning while keeping each customer's data and any model information derived from it, separate and private to each customer, while still sharing general learning that is based on non-confidential, public data. Keeping those data processes separate ensures that information cannot "leak" from one customer to another, even statistically.

Introduction to an Example Implementation

The following is a description of an example system. See FIG. 1. This system relates generally to methods and apparatus for the AI self-supervised creation of hierarchically semantically labeled documents and/or for the assisted authoring and processing of such documents. This includes such processes as composing, structuring, annotating, modifying, reviewing, extracting data from the documents, and/or using such data in downstream business processes. More specifically, it focuses on documents that are similar to prior documents, by using mainly unsupervised and self-supervised machine learning techniques across sets of documents, including relatively small sets, to discover a detailed hierarchical structure of documents, composed of many semantically meaningful chunks, associated with their roles; and on the use of such highly-enhanced documents in business processes.

Operation of this example system uses the following processes, which are described in more detail in the following sections. This is merely an example. Other implementations may use different combinations of steps, including omitting steps, adding other steps and changing the order of some steps. They may also use different implementations of the steps listed below, including different combinations of techniques described under each step. In FIG. 1, the steps are preceded by "S", so step 1 below is labelled "S01" and so on.

1) Import: Bring groups of users' documents into a data store 110.
2) Organize: Divide the documents into document sets by type, such as rental vs. sale agreements, or medical histories vs. current clinical notes.
3) Visual extraction: Extract a linear text stream(s) from each document based at least on its content and visual layout, including limited information about distinct text and other areas, their beginning and ending locations, formats, and contents. The extracted data may be organized as "visual lines" or as "visual blocks" (also called "hyperlines" or "visual" chunks) such as paragraphs distinguished by geometric layout.
4) Structure: Identify headings, list items, and other broad classes of structure chunks in the documents.
5) Re-nesting: Determine the nesting relationships of sections and lists, and the scope of the text of each.
6) Topic Chunking: Analyze the topical content of each document and produce chunks enclosing areas of similar topic (topic-level chunks).
7) Topic Labeling:
   i) Use embeddings and clustering to produce candidate datatype and semantic role labels for each heading in the corpus.
   ii) Use key phrase extraction techniques to produce candidate datatype and semantic role labels for chunks.

8) Chunk Labeling: Identify and assign (possibly multiple) datatype and semantic role candidates to other chunks throughout the documents using a plurality of methods, for example neural networks, word and character embeddings, grammatical analysis and pattern matching, regular expressions, similarity metrics, and/or other methods. Of particular interest for certain embodiments are:
   i) Grammatical parsing and pattern-matching on the resulting structures
   ii) Use of question-answering technologies to connect small chunks with particular semantic roles they play in documents.
   iii) Combining XPath tree-matching with word-embedding technology to match patterns in structure and grammatical trees, despite possibly extensive differences in phrasing and word choice.
9) Named Entity Recognition (NER): Identify and assign datatypes to chunk that are detected as Named Entities throughout the documents.
10) Role labeling, Extractive labeling: Assign semantic role labels to the chunks, such as representing that a name constitutes the "seller" party to a contract, or that a drug is mentioned as an allergy vs. as a prescription.
11) Anomalies: Identify semantic roles that are usually present or absent in documents of the document set under consideration, but not in the current document (or vice versa).
12) Arbitration: Adjust and/or choose among alternative scopes, datatypes, and semantic role labels for chunks, producing Well-Formed structures readily expressible in formats such as XML.
13) DGML: Create an enhanced version of a document, which contains explicit identification of chunk locations, datatypes, and semantic role labels, and possibly also additional information such as the confidence level of each identified chunk, the datatype expected in similar chunks (such as date, date range, personal name, and so on), and so on. The enhanced version is created using an XML-based markup language referred to as DGML.
14) Feedback: Display the enhanced version to a user(s) and select chunks (and potential locations for possibly-omitted chunks) to show the users, collecting the user's choice to confirm, deny, or make other changes. Users can also choose their own reading and review order freely. Feedback can also apply to any other interpretations the system has made, such as organization of documents into document sets as described in step (2).
   i) In the case of possibly-omitted chunks, provide prioritized examples from other documents, that can be examined and/or copied into the current document as desired, and automatically customized by applying target-document values for smaller, nested chunks.
15) Feedback response: Track the user's responses to these interactions, and use that information to fine-tune the models 120, as well as to prevent repeating the same or similar errors later.
16) Downstream communication, Transmit: Select chunks by type and/or role, and use them to generate reports over document sets, and/or export them to downstream systems that add function such as back-end contract databases, regulatory compliance checkers, management report generators, and so on.

Figure 2:
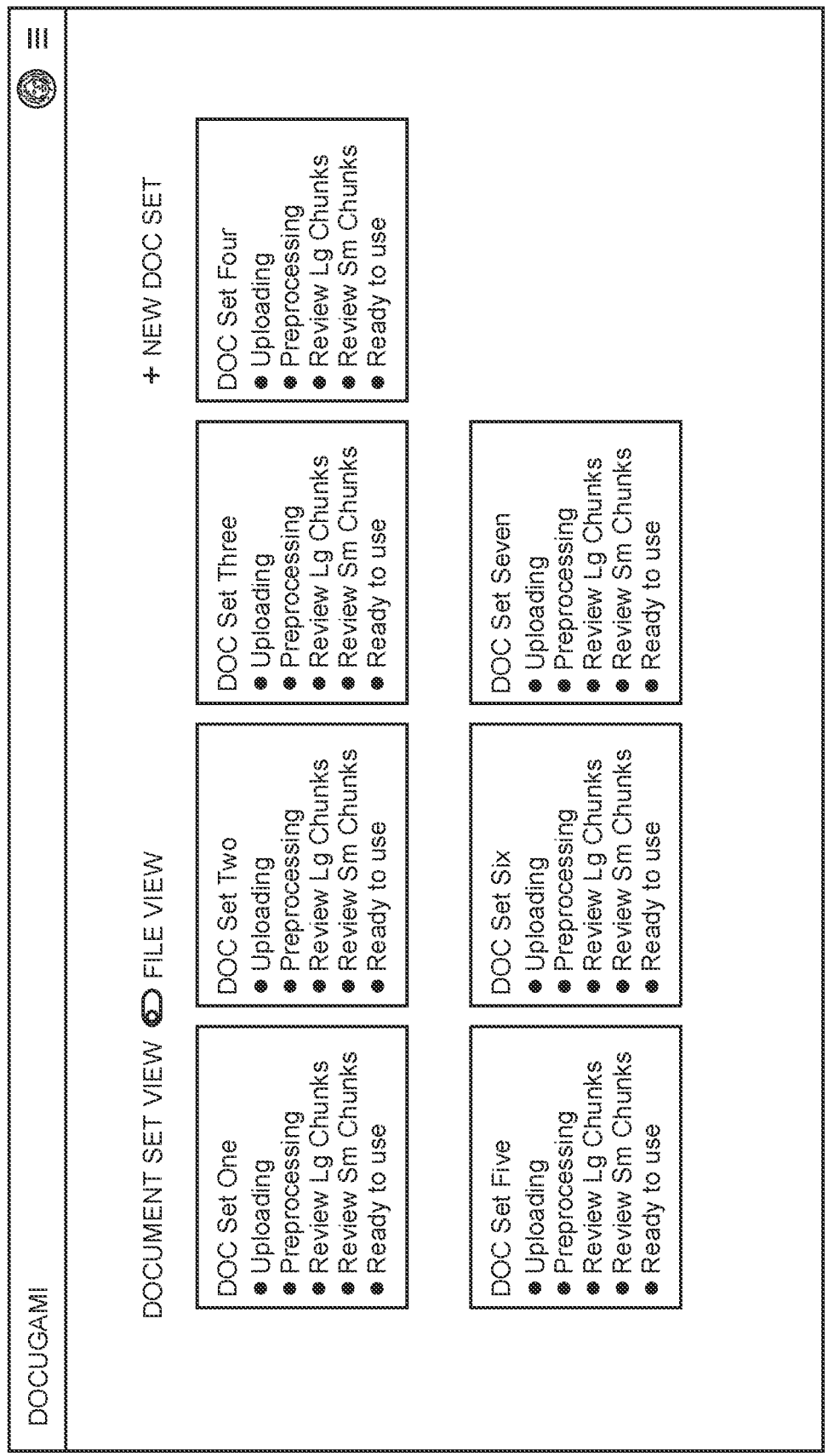
FIG. 2 is a screenshot showing a dashboard that tracks the processing of different document sets through the system of FIG. 1.

FIG. 2 is a screenshot showing a dashboard that tracks the processing of different document sets One through Seven, through the process described above. In this dashboard, the process is divided into the following stages:
   Uploading
   Preprocessing
   Review Large Chunks
   Review Small Chunks
   Ready to Use
The color coding shows the degree of completion. Green stages are completed, red stages are in process, and black stages are not yet started.

Each of the steps listed above is described in more detail below.

Further Description of Example Implementation

The numbering here reflects the general order of analysis for this particular example. However, not every step depends on every prior step, and, as a result, many elements can be re-ordered or parallelized in other implementations. Elements can also be shifted or even repeated so as to exchange additional information with other elements, or elements can be run independently, such as in separate processes or machines.

1) Import

The system accepts typical word-processor documents (such as MS Word) and page-layout documents (such as PDF or .png files). In each case, visually-contiguous regions, such as headings, paragraphs, table cells, table, images, and the like are identified and represented as chunks, using a combination of their relative positions, surrounding whitespace, font and layout characteristics, and so on. These features are partly chosen by designers, and partly learned by image and pattern analysis on large number of documents. For incoming document that do not have machine-readable text content already, OCR is also applied.

Those chunks, along with selected layout information, are presented to later modules in the system.

2) Organize

Users do not have to organize the documents they check in to the system. The system uses clustering methods operating on text content, layout information, and structural information already detected (such as identification of some headings) to group documents into "sets" for specific types of documents, for example rental agreements vs. lease vs. sale. The particular document sets found can be checked with the user, and named either automatically or by the user. Once established, these document sets facilitate later machine learning and reasoning about the format, content, semantic roles, and differences within them. For example the system may discover that almost all documents in a given set have a particular section with three particular sub-chunks of particular roles and datatypes of personal name, one of which recurs in five different sections. Such patterns are used to help identify similar (and dissimilar) parts of other documents, to suggest review or changes to the user, and to provide example text for re-use in other documents in the same (or possibly different) sets.

The clustering of documents into document sets can use features from document structure (the order and containment relations between chunks of various sizes, datatypes, and roles) and layout, as well as text content. Once some chunks and/or roles have been identified in at least some documents, that information can also be used to improve clustering, either by completely re-clustering, or by smaller adjustments. For example, similar documents might become nearly or even entirely identical if one ignores the particular content of chunks with the same role, such as seller and buyer names, addresses, etc.; or checks that the pattern of appearance of different chunks is the same, for example that one name (say, the seller's) appears in certain places, while another (say, the buyer's) appears in certain other places.

The system maintains both the original organization of uploaded files into directories (if any), and its own organization of them into sets. Thus users can view both organizations, and learning algorithms can use both as information. For example, some users name documents according to various conventions, and/or organize documents by customer, kind of document, or other features, which are almost always useful for understanding patterns of similarity (such as having common chunk locations and roles) and relationships between documents.

3) Visual Extraction i) Area Finding

The system uses heuristics and machine learning to identify regions in documents based on geometric patterns. For example, in many documents meaningful chunks have a special layout, such as a signature block, abstract, list of definitions, tables, etc. Such patterns can be learned automatically by considering geometric and/or layout features, uniqueness or rarity, and/or correspondence either within the same document or across documents, especially within the same document set.

Approaches are chosen depending on the format of the incoming document. For example, word-processor documents generally provide explicit information about paragraph boundaries, but PDFs or scanned pages require the system to assemble them from visual lines, or even to analyze whitespace dimensions to assign characters into visual lines (such as in multi-column documents).

ii) Signature Finding

The system creates signatures (also known as "digests") for document parts, and uses these to identify and categorize ""interesting" additional chunks and find their boundaries. Signatures are not just based on text content, but also on the various aspects of context, and may ignore the content of smaller contained chunks (for example field chunks whose content in counterparts varies).

A signature may use even a chunk's pixel representation. The bitmap image of the text layout is divided into tiles, preferably of size on the order of 24 pixels square (adjusting for scan resolution), and the tiles are clustered. Autoencoders and neural network processing of these, including their neighbor relationships, reveal similar visual events such as the boundaries between text and rules, edges and corners of text blocks, even indentation changes and substantial font/style changes. Further neural networks then use this clustering to co-identify similar layout objects, which frequently indicate or characterize important chunks.

The approach here may use unsupervised approaches for generating document chunk embeddings based on the pixels as well as the characters in the document chunk, the size of the chunk, its location in the document, etc. (as noted, images can also be chunks). Clustering and comparison techniques can then be used on these embeddings for many downstream tasks.

iii) Extraction

This aspect takes a post-layout document (e.g., a PDF or scanned printed page) and transforms recognized character images ("glyphs") in the document into a text stream that represents the correct document order of the glyphs (the stream may also contain figure or image objects when appropriate, and there can be multiple streams, such as footnotes or page headers, which do not have typical places in the reading order). In some documents there is incomplete explicit representation of the reading order. A well-known example is that there is typically no indication that multi-column layout is in effect at any given point, and thus the first "line" extends only halfway (or less) across, rather than all the way. However, there are many additional examples where the order of text may be complex or non-obvious. For example, some layout programs draw each character separately, making word boundaries non-obvious. Table cells, side-bars, figures, footnotes, and other displays may not have an obvious position in the text order. Some text such as that in page headers and footers (as well as end-of-line hyphens) may not require a place in the text order at all. Many formats provide no explicit indication that something is in such special categories.

The system addresses this task by combining visual information (location, style, etc.) of the glyphs, with a deep neural network that understands characteristics of the written language used in the document to build the text stream. In addition, it detects many basic text boundaries, such as for line, block, column, image, inline font-changes, and header/footer objects.

iv) Represent

Having extracted a text sequence and some hypothesized structure chunks, the system creates a representation of a document (known in one example as "DGML") that includes those as well as information about visual characteristics (fonts, colors, sizes, etc.). The representations of chunks, including information such as their location, type, and role, are called "annotations". The combined data can then be used by natural language processing (NLP) and deep neural networks (DNN). Deep neural networks incorporate this visual information to assist in structuring the document into a hierarchy to represent the document structure, including chunks such as headers/bodies, lists/list items, etc.

Sufficient information can be included so that later aspects can construct an editable word-processor document which closely resembles the original source. This can be included in DGML or a similar representation along with other structure, content, and chunk information. In many cases, portions of the document with distinct formatting and layout are also useful chunks. However, formatting characteristics that do not coincide with otherwise-needed chunks (and vice-versa) can still be represented, via a special type of chunk, via standoff annotation, or via other methods.

4) Structure

The structure pipeline converts a flat text file into a hierarchical structure, where sections, subsections, and other parts of the document form an Ordered Hierarchy of Content-Based Objects, a structure known to those skilled in the art. This conversion is done using unsupervised machine learning techniques. This method has several stages:

i) Hyperlining

This involves segmenting the text into "hyperlines", which are groups larger than visual lines, and comprise more meaningful logical (as opposed to visual) units such as paragraphs, headings, or similar. This is preferably accomplished using a pre-trained neural network which considers features such as the "word shape" of tokens (especially leading and trailing tokens), layout information such as font and spacing characteristics, and similar features. Some hyperlines may also have been provided by earlier steps (depending on the input document's format).

ii) Document Language Model

This preferably uses a Document Language Model which also includes information on text content, formatting, and whatever structure has been discovered so far, instead of a Language Model based just on the text. This enables better detection of chunks and their hierarchy (such as headers/ bodies, lists/list items, etc.) due to learning to recognize meaningful chunks and patterns of their occurrence from formatted pages.

This creates a representation of a document that includes both the textual content and the visual characteristics (geometry, fonts, colors, sizes, etc.). Deep neural networks and NLP processes then utilize such information in the task of structuring the document into a hierarchy of chunks with datatypes and semantical role labels, by finding the scopes and/or boundaries of various-sized chunks that represent document structure. At this stage, the chunks discovered are mainly headings, sections, lists and items, tables, figures, and other relatively large units.

iii) Hyperline Clustering

This uses an autoencoder to cluster the hyperlines across the document set based on the word-shape structure, assigning each hyperline to a cluster of hyperlines that are similar in terms of layout, starting and ending content, and other characteristics, with each cluster identified by a "cluster ID" (this should not be confused with the creation or identification of document sets).

iv) Inline Headings

A special case of particular interest is "inline headings", where the heading of a chunk (which sometimes provides the chunk's semantic role) is not on a separate visual line(s) by itself but is on the same line as the start of following text. Commonly, inline headings are distinguished typographically, such as by boldface, underlining, a different font, a following colon, or other effects. Separate heuristic and neural algorithms identify these chunks.

v) Few-Shot Structure Learning

In spite of the advanced structuring methods described above, it can be expected that the structure that is generated has certain imperfections or does not meet the user's a priori expectations. Few-shot structure learning takes care of creating a machine learning model relying on feedback provided by the user, as described in steps (14)-(15). This model is then used to generate a structure that combines the user feedback on structure with the one already produced by the system (and perhaps iteratively enhanced by prior feedback).

The main principle applied in this case is derived from machine translation (MT) methods where a sequence is converted into another. In this case, one sequence describing the hyperlines is converted into another that also contains start/end markers that encode the hierarchy.

This process takes place in different phases or steps:
(a) First, a machine translation model is pretrained using a publicly available dataset.
(b) The "dispatcher" (see Section 'Feedback Response' for a description) filters the user feedback.
(c) New structure files are generated from the user feedback and a fine-tuning machine translation data set generated.
(d) The pretrained model is further trained using the few-shot learning principle.

5) Re-Nesting

This aspect uses a "corpus re-nest" algorithm which, given a flat list of cluster IDs, preferably from the Hyperline clustering step, iteratively creates a nested structure using a pushdown automaton. By comparing the signatures of neighboring hyperlines, the system can determine whether a given heading or list item belongs at a more, equally, or less nested level. This allows reconstructing the multiply-nested hierarchical structure of many documents (such as chapters, sections, subsection, clauses, lists, etc.).

Features considered in the re-nesting include the "shape" (as known in NLP technology) of tokens in the hyperlines, especially considering the first and last; the particular class of punctuation mark (if any) ending a preceding line; capitalization; formatting information such as leading whitespace, indentation, bold, and underline; the presence and form of an enumeration string at the start of a line (for example, patterns like "IV(A)(1)" or "iv)") or a particular bullet or other dingbat character; the value of that enumerator; the presence, levels, and values of preceding enumerators of the same kind; and so on.

6) Topic Chunking

This aspect uses lexical statistics and other learning techniques over successive chunks of the document, to find where topics shift. This enhances the identification of boundaries for large chunks such as entire sections on given topics, because a section (of whatever level) generally has more uniformity of topic, vocabulary, and style within it, than it does with neighboring sections.

7) Topic Labeling i) Heading Labeler

For each header in the corpus, as shown in FIG. 1, this step
Creates a numerical representation known as an "embedding" for each heading.
Clusters the headings based at least on those embeddings.
Filters out "bad" clusters based at least on measures such as density, arity, and level of similarity.
Propagates the most common semantic role label in each remaining cluster, to all headings in the said cluster.

ii) Keyphrase Labeler

For each chunk, this step uses an ensemble of key phrase extraction techniques (such as Rule-based linguistic techniques, ML, Statistical, Bayesian, and/or others) to produce candidate semantic role labels for the text.

8) Chunk Labeling i) Grammar

This aspect of the system begins with linguistic analysis of text, such as natural language processing tasks including Part of Speech Tagging, Dependency Parsing, Constituent Parsing, and others. This system then applies tree-matching mechanisms from another domain, to locate grammatical and other structures within the trees or tree-like structures discovered via NLP. These include document structuring methods such as tree grammars and tree pattern matching, as exemplified by tools such as XPath, GATE, and others.

Using such patterns to identify grammatical phenomena in sentences enables the system to extract semantic role labels from the text itself, which are then used to annotate nearby chunks. For example, a search pattern can be constructed that matches the sentence "The following are the terms of our agreement" (and other sentences with similar grammatical structure) based on the constituency structure of the sentence; and then to extract the noun phrase (in this example, "the terms") and use it as a semantic role label for one or more chunks in the content that follows this sentence and contains such "terms".

ii) Question-Answering

Question answering techniques, including BERT for Question Answering, are specially tuned to identify semantic role labels for candidate chunks (for example, dates, person names, dollar amounts). Most traditional question answering models, in contrast, aim to answer questions like "What is the Effective Date?". This system instead trains models to answer questions like "What is Jul. 8, 2018?" and aims to predict "Effective Date" or "effective date of X"

where X represents another chunk (not merely "Date", which is a datatype rather than a semantic role) in the text.

This system also discovers synthetic questions that, when answered, can point to relevant information in text. This provides the ability to automatically pose questions to be used by question-answering.

iii) XPath-Like Rules Integrated with Embeddings

Here, tools in the domains discussed under "Grammar" are integrated with tools that provide vector-semantic representations of text, such as word2vec, char2vec, and many related methods. This system enables analysts to express and query for patterns that include both the structure information well-handled by XPath and similar tools (which can include chunk data expressed in XML- or DOM-compatible forms); and the fuzzy or "semantic" similarity information well-handled by vector models.

9) NER (Unlabeled Small Chunk)

Technology can identify some chunks by datatype, such as personal or corporate names, addresses, and so on (this is known as "Named Entity Recognition" or "NER"). However, NER falls well short of identifying the semantic roles of those entities in the document. Current technology also fails to identify larger chunks such as entire clauses or sections, or groups of chunks that comprise meaningful or useful larger chunks.

This aspect of the system detects interesting small chunks, without necessarily also assigning them roles. Many methods and tools exist for identifying NERs in text. This system uses multiple methods, examples of which are listed below. These innovations are mainly unsupervised:

i) Established NER Methods ii) Expected Words

Building a model of "expected words, in context, for normal English", by training a language model of n-grams using extensive generic text such as Wikipedia. When looking at a particular document, the system provides means to identify n-grams that do not fit that generic model, and so tend to be special to the document being processed.

iv) TF-IDF

This is a TF-IDF-based approach ("term frequency vs. inverse document frequency"), and is used in conjunction with Label Propagation and Contextual Semantic Labeling.

v) Sequence Clustering

Extracts small word or character sequences such as n-grams, and clusters them using contextual embeddings (for example those of BERT). The expected result is that n-grams that share semantic meaning will start clustering together. The cost of combinatorial explosion is addressed by using heuristics (including on the syntax tree) to filter out some n-grams prior to clustering. A wide variety of clustering algorithms may be applied. In this example, the hdbscan algorithm achieves effective clustering while assigning random noise to a "none" cluster.

vi) Few-Shot NER

The system uses few-shot learning techniques to generalize from a small number of labelled instances (for example, selective user feedback), to a more widely applicable rule or adjustment of learned parameters. This greatly reduces the number of times users must be asked for feedback, and more rapidly improves the system's performance.

10) Extractive Labeling

This aspect of the system finds semantic role labels for small chunks, which appear directly in the sentence(s) surrounding the chunk. Meaningful chunks often have their role specified in some form by the context. For example:

Jane Doe (the "Seller"), resides at . . .

Rent of $999 must be paid by the end of each month.

i) Contextual Semantic Labeling (CSL)

This process uses neural networks operating on previously-built structures including sentence parses, to learn what parts of the text are likely semantic role labels for various chunks. Many chunks may already have such labels, with various sources and confidence levels, but this provides additional evidence for or against those, as well as new labels. Some of the patterns here involve grammar. For example, in "Doe shall pay a rent of $1000 by the last business day of each month" the head verb makes clear what the role of the currency amount is: namely, it is the amount of rent to be paid. Other patterns are learned automatically, by supervised and/or unsupervised methods using features of the structure, chunking, labeling, and content available in context. Formatting such as parentheses, table layout, key phrases and words, and other features also provide features for the neural network.

Useful information often resides in a containing chunk such as a section or subsection, or its heading. For example, whether a given medication is relevant as a prescription vs. as an allergy might only be detectable by looking at the heading of a containing section (this is another example of why detecting the correct hierarchical nesting of sections is important). Many other clues exist that can be learned by machine learning techniques and applied to discover the applicable roles for various chunks. Cross-document similarities can also be used, especially with documents in the same document set, to associate semantic roles that were discovered for similar contexts but might not be discoverable for a document in isolation.

ii) Label Propagation

This process standardizes labels across similar chunks of text in a corpus of documents. It applies both to labels extracted from context, and to labels available from prior steps. The algorithm uses Agglomerative Clustering to cluster chunks based on their embeddings, ranks candidate labels for each cluster of chunks using a weighted PageRank algorithm (which uses the frequency/confidence of the labels as initial node weights), and uses co-occurrence and embedding similarity to determine how similar labels are to each other. It then assigns labels to the chunk based on their cluster-level score and how similar the chunk that we're labeling is to the chunk that the label came from (in terms of content, embeddings, structure, datatype, semantic role, and/or context). Agglomerative Clustering and PageRank algorithms are applied to propagate labels across similar contexts, and to make labels more consistent across a set of documents.

11) Anomalies

This aspect of the system examines multiple documents within a document set, such as produced in step (2), and identifies chunks which occur in the current document but do not commonly have counterpart chunks in other documents of the same set, or vice-versa. The counterpart chunks need not have identical content, structure, formatting, context, datatypes, and semantic roles, but may have variations from one document to another. Nevertheless, they can be recognized as substantially similar in those ways to other identified chunks.

When the new document includes chunks that are typically not present in other documents of the same set, the user may be queried about some or all of them, in order to confirm that they were actually intended. In this example system, such querying will be more prevalent when the chunk in question is common to the new document and the one (if any) on which it was based, but few others.

When the new document lacks counterpart chunks that are typically present in other documents of the same set, or even in particularly relevant external sources (for example, a manual of house style, a compliance requirement, etc.), examples of some or all such chunks are suggested to the user, with the content drawn from other documents. The suggestions may be ranked for the user, depending on factors such as frequency of use, being most typical (a centroid) of the available alternatives, or having high probability of co-occurrence with other chunks present in the new document. The chunk suggestions may be automatically updated, for example to replace names, dates, and other sub-chunks specific to the documents the examples are drawn from, with values drawn from the new document.

Furthermore, the choice of chunks to be suggested for addition or deletion, can usefully depend on the practices of different authors, editors, or other staff. For example, if the current author's documents frequently differ from another author's in a particular way, that may indicate that the difference is a considered choice, not an error. On the other hand, if all the authors working under the same supervisor do something one way but the current author differs from that, that may indicate a greater need for review, at least when first noticed.

The modeling of anomalies considers structure and chunk datatypes and semantic roles as well as context, content, and format. For example, modeling the patterns of what datatypes and semantic roles of chunks occur inside, adjacent, or otherwise near others. Violations of well-established patterns may be classified as anomalies and presented for user feedback like any other anomalies.

12) Arbitration

Many prior steps create and/or operate on chunks of the document which were defined as (typically but not necessarily contiguous) ranges of characters, tokens, and/or non-text objects within the linear sequence(s) produced in step (3).

The chunks under consideration at any point, can be represented either by "inline" meta-information such as markup, or by "standoff" representations that refer to locations in the text by various kinds of pointers. In this example, standoff representations are used for most processing, but inline representations are used for some purposes such as communication with external tools, which often prefer that. These representations and others are functionally interchangeable, and the choice between them can be governed by concerns of performance, convenience, and so on.

The representation of chunks includes information about what steps or implementations created them, how certain they are (the "confidence level"), and their specific datatypes and/or semantic role labels. There may frequently arise redundant, uncertain, conflicting, or partially overlapping chunks, which we refer to here as "non-optimal". For example, two or more different processes may attach semantic role labels to the same span of text (or almost the same span, for example one including "Dr." before a name, and one not). Chunks may be nested, sometimes deeply, but may also overlap arbitrarily (that is, where each of the overlapping chunks contains some content that is also in the other, and some that does not). Throughout the steps above a system may maintain representations that can represent large numbers of annotations, including overlapping or co-located ones.

Such non-optimal chunks are usually undesirable, at least when the document is presented to a user. In addition, many state-of-the-art NLP tools prefer non-overlapping structures, as do many document tools and methods familiar to those skilled in the art, such as XML, JSON, SQL, and other representational systems. The more restricted structures usually preferred, are often termed "hierarchical" or "well-formed", and avoid partially-overlapping chunks.

This aspect of the system modifies the collection of chunks to be strictly hierarchical, and to avoid non-optimal chunks. This can be accomplished in a plurality of ways. First, chunks can be deleted entirely (that is, the chunks per se; the document content which they identified is not deleted). Second, chunk scope may be modified (for example, by including or excluding one or more characters or tokens from either end), to prevent overlap with another chunk(s). Third, chunks may be determined to be redundant, and merged. Fourth, chunks may be found contradictory (for example, if one tool thinks "Essex" is a place, and one a person), and a choice made.

This process includes means to rapidly find cases of partial and/or complete overlap; to compare chunks by type, role, and confidence; and to resolve non-optimal cases by modifying chunks and their associated data. Choosing what chunks to modify, merge, or delete considers several factors such as confidence levels; a priori probability of a given chunk datatype, semantic role, and content; hyponymy between semantic role labels; conditional probabilities of occurrence in the given context; number, roles, and distribution of other chunks in the current and other similar documents; priorities of the process at that time; customer feedback about similar cases; and/or other methods.

Modifications may change chunk confidence levels as well. For example, several aspects of the system may apply similar or identical semantic role labels to the same or nearly the same portion of the document. In that case, the labels are typically merged, and the resulting chunk is assigned higher confidence than the individual chunks it subsumes. In other cases, a choice between contradictory chunk assignments is made, but the chosen chunk may end up with reduced confidence to reflect that there was some level of counter-evidence.

This process improves the quality and consistency of chunk identification and labeling, enables the information to interoperate with a wide range of tools, and enables the result to be analyzed more easily and reliably. The operations just described can be applied at any time(s), not just at the end. For example, if a prior step uses an external tool for some subtask, it may request reduction to well-formedness. Removed or modified chunks can instead be "suspended", which means they no longer affect processing but can be re-introduced on demand; this enables such use of non-overlap-supporting tools, without having to re-create prior work from scratch afterward, and increases processing flexibility and speed.

In one approach, all overlapping and/or all non-optimal chunks are resolved before generating a document shown to the user, so that the result can be readily encoded in hierarchical formats such as the XML formats used by many modern word processors and other tools. However, it is also possible (even in XML) to maintain multiple possibly overlapping alternatives at specific locations for potential later resolution, such as by user feedback or improved algorithmic learning.

13) DGML (DocuGami Markup Language)

The enhanced version of a document represents document structure, format, content, and identified chunks, and may identify which steps of the process identified which chunks, and with what level of confidence. Some embodiments use XML as the syntax of this representation, although a wide range of representations could contain substantially the same information, such as other XML schemas, JSON, various databases, custom text or binary formats, and so on.

In this step, the document and the information about its found chunks are converted (or "serialized") into an XML form that can easily be passed to other processes, most notably the front-end user interface used for feedback, editing, and review; and to formats useful for "dashboard" applications that provide overview, statistical, and compliance information to other users such as group managers, quality-control staff, and so on.

DGML, Docugami Markup Language, is a particular XML schema for this use, which accommodates all of the described information in one package. Most prior schemas may deal with structure, content, and sometimes layout, but do not annotate "chunks" in the abstract as described here. Many prior schemas also do not provide a generalized mechanism where chunks can be automatically detected and represented on the fly, particularly along with confidence levels and provenance information.

It is also possible with some word processor and other tools' file formats, to "tunnel" the same information by representing it in forms that are transparent to that format. For example, if a tool supports embedded comments or metadata, "invisible" text, ignorable attributes, or other similar features, the information described herein can be concealed within them, permitting the resulting document to be used, and possibly modified, in that tool; and to be returned to the system with the tunneled information still available.

14) Feedback Mode Front End

The extensive annotation and analysis attached to documents and their discovered chunks by the methods already described make it feasible to guide users through editing samples, templates, or prior documents, to produce similar but new documents customized for current needs. For example, this system typically identifies the parties and property subject to a contract; the medications or conditions listed under medical history, current findings, and other specific sections of clinical notes; relevant dates; and so on. By also examining other document of the same document set, this system learns which things are uncommon, common, or required, and can therefore make more useful recommendations to the user on what to review and/or update. For example, an effective date may be present in nearly every contract in a document set, but its value may be different in each. Similarly, the parties change, but the kinds of parties are much more consistent.

i) Unguided Feedback

In interacting with the user, the system first requests feedback regarding the chunks found (or possibly not found) in a few documents. The first few documents presented for feedback will be the "cluster centroids" for a document set. The final few will be "outliers" in the document set.

ii) Guided Feedback

After this, the system guides the user to provide feedback by showing them selected portions of the document, and asking about present or potential labels for them, their extent, and so on:
   a. "Interesting labels" are determined by a PageRank-based algorithm and a grammatical and structure model. Among those labels, a set of low confidence instances is chosen for review.
   b. When there are no more low confidence labels in the current document, the same process may be repeated for additional documents. In some embodiments, models are continuously updated based on the feedback the user is providing. However, the feedback can instead be accumulated and applied later, in batches, and/or offline. Adjustments to the models, in turn, can affect the choice of chunks and labels thereafter presented for feedback, and may trigger re-analysis of some documents.
   c. The system solicits feedback on field and structure chunks using substantially the same mechanism. In one approach, all chunk-detectors provide estimates of confidence, which can be used along with other information to select candidates for feedback.

Figure 3:
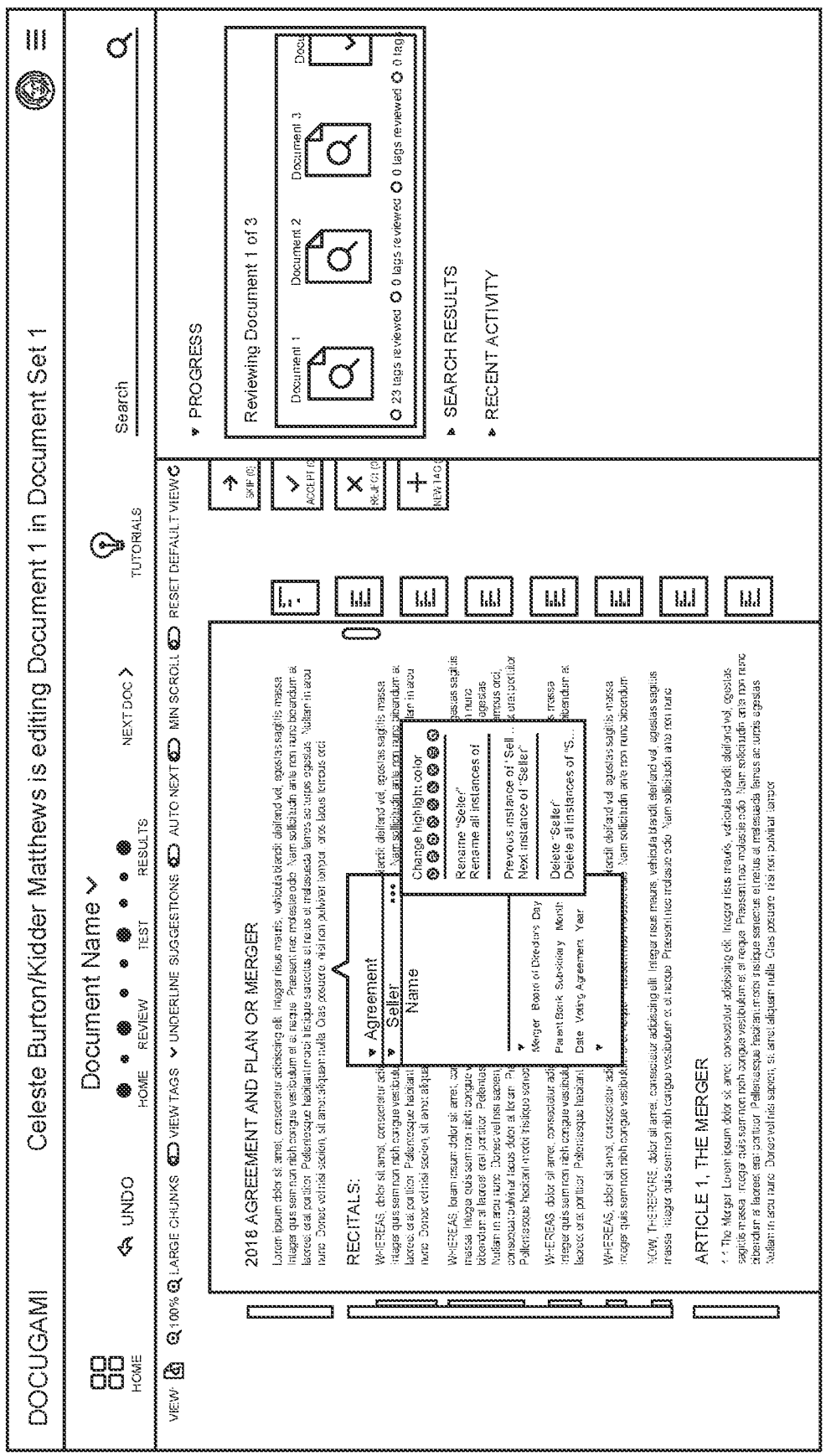
FIG. 3 is a screenshot of a user interface for receiving feedback from the user.

Feedback may be requested in different passes for smaller vs. larger chunks, field vs. structure chunks, or in other orders. See FIG. 3 for an example user interface for user feedback. It displays some or all chunks, and allows the user to select particular ones to examine, seeing the assigned type and/or role, and optionally alternatives. The user can move chunk boundaries, choose or edit labels, and so on. Preferably, users can also request that a particular change (such as to the label) be applied to all corresponding or same-type chunks.

15) Feedback Response
   i) Fleet querying is a method that allows the system to query both private and public data based on user feedback, typically from multiple users. Chosen examples are both semantically and syntactically similar to previous failure cases, which increases the value of the feedback.
   ii) Dispatcher. The dispatcher is a methodology for connecting user feedback on the combined output of a number of ML models and non-ML algorithms back to the particular learning models 120 that can learn from the feedback.

The system allows models to improve from user feedback on its output and from user feedback on the output of other learning and non-learning models. This is accomplished by using feedback as incremental (also called "fine-tuning") training data for the several numerical and neural models described. After feedback is used to improve the models, not only is the particular document re-evaluated, but all documents in the set, or even all documents for the user. Thus, feedback on each document can improve chunk identification, role assignment, structure discovery, and thus user assistance, for all documents. This retraining is represented by the dotted connector from step (15) to step (3) in FIG. 1.

A document and all associated information contribute to the learning and to analyses of sets of documents (especially but not exclusively within particular document sets), and so improve performance on future documents. For example, once a new chunk has been added to one or more documents in a set, it is available for use in future documents (or revisions of older ones), and can be suggested for future documents. At some point the absence of a recently-introduced chunk role, or the presence of a chunk role less-used recently, may become an anomaly. This point can be chosen by the user at their initiative or in response to a feedback question, or automatically based on the usage curve of counterpart chunks over time. For example, if few to no documents in one set that were composed before a certain time had a chunk of a given role and/or context (say, an "Exclusions" section), but most or all that were composed later do have it, then lack of a counterpart chunk is likely anomalous in new documents, and may usefully be suggested to the user as such.

16) Downstream Communication

Figure 4:
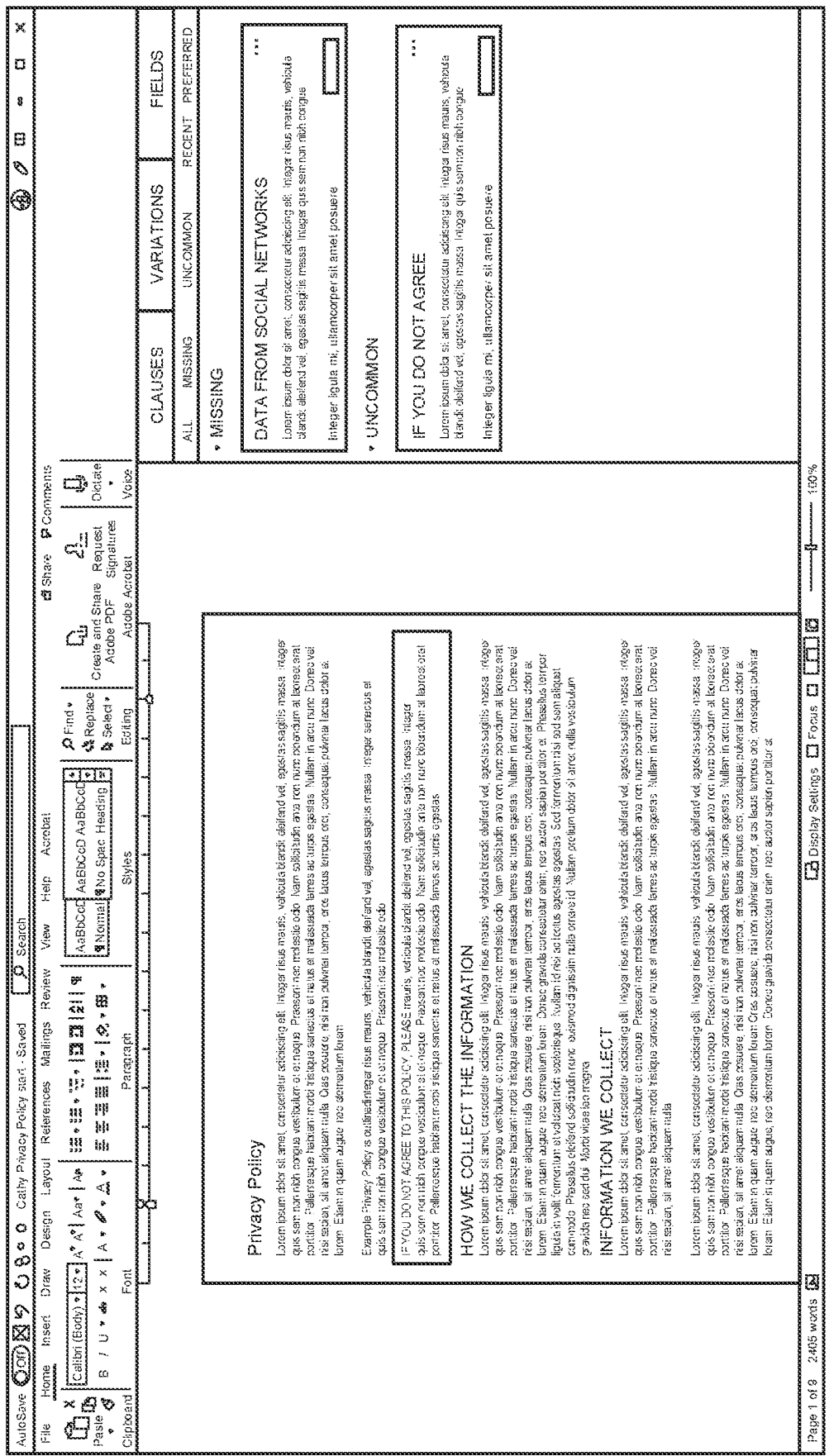
FIG. 4 is a screenshot of an integration with other software applications.

Having annotated a document(s) with chunk information such as has been described, selected information is converted to particular formats required by external business information systems such as databases, analytics tools, and so on, and passed to those systems, either directly or through automated and/or manual review steps. For example, names and address of particular parties can be copied to the correct fields in a database, which could not be done automatically if they were only identified as "names" and "addresses" per se. See FIG. 4 for an example of integration with a downstream software application. In this example, chunks have been extracted that represent terms to which a party is expected to assent, and they are passed to a downstream application similar to Docusign to be filled out and signed.

Figure 5:
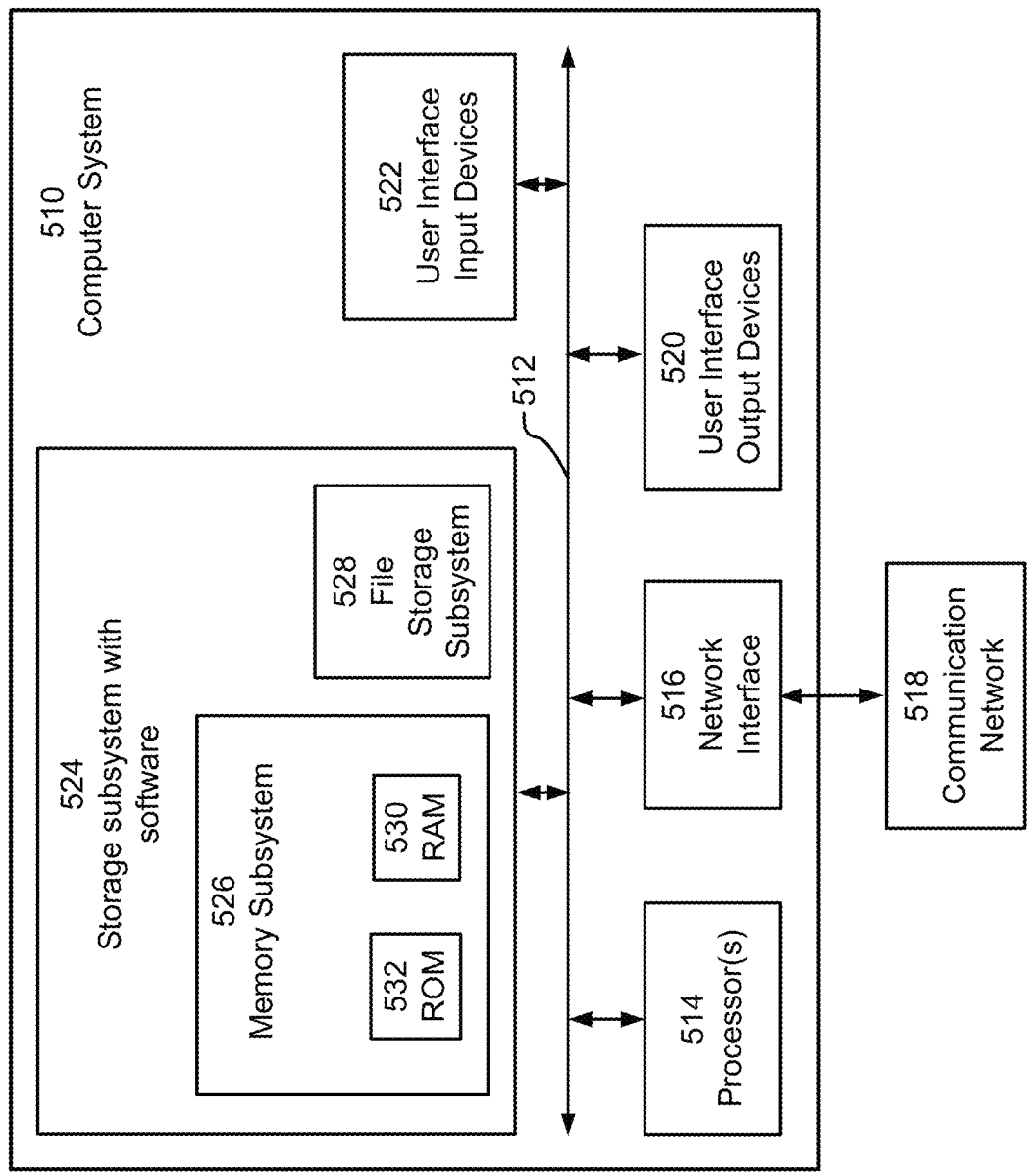
FIG. 5 is a block diagram of one embodiment of a computer system that may be used with the present invention.

FIG. 5 is a block diagram of one embodiment of a computer system 510 that may be used with the present invention. The steps described above may be implemented by software executing on such a computer system. The computer system 510 typically includes at least one computer or processor 514 which communicates with peripheral devices via bus subsystem 512. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). These peripheral devices may include a storage subsystem 524, comprising a memory subsystem 526 and a file storage subsystem 528, user interface input devices 522, user interface output devices 520, and a network interface subsystem 516. The input and output devices allow user interaction with computer system 510.

The computer system may be a server computer, a client computer, a workstation, a mainframe, a personal computer (PC), a tablet PC, a rack-mounted "blade" or any data processing machine capable of executing instructions (sequential or otherwise) that specify actions to be taken by that machine.

The computer system typically includes an operating system, such as Microsoft's Windows, Sun Microsystems's Solaris, Apple Computer's MacOs, Linux or Unix. The computer system also typically can include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi-processor or multi-core system and may use or be implemented in a distributed or remote system. The term "processor" here is used in the broadest sense to include a singular processor and multi-core or multi-processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions to perform any one or more of the operations discussed herein. Due to the ever-changing nature of computers and networks, the description of computer system 510 depicted in FIG. 5 is intended only as one example for purposes of illustrating the preferred embodiments. Many other configurations of computer system 510 are possible having more or less components than the computer system depicted in FIG. 5.

Network interface subsystem 516 provides an interface to outside networks, including an interface to communication network 518, and is coupled via communication network 518 to corresponding interface devices in other computer systems or machines. Communication network 518 may comprise many interconnected computer systems, machines and communication links. These communication links may be wireline links, optical links, wireless links, or any other devices for communication of information. Communication network 518 can be any suitable computer network, for example a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 522 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into computer system 510 or onto communication network 518. User interface input devices typically allow a user to select objects, icons, text and the like that appear on some types of user interface output devices, for example, a display subsystem.

User interface output devices 520 may include a display subsystem, a printer, or non-visual displays such as audio output devices. The display subsystem may include a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 510 to the user or to another machine or computer system.

Memory subsystem 526 typically includes a number of memories including a main random-access memory (RAM) 530 (or other volatile storage device) for storage of instructions and data during program execution and a read only memory (ROM) 532 in which fixed instructions are stored. File storage subsystem 528 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 528.

Bus subsystem 512 provides a device for letting the various components and subsystems of computer system 510 communicate with each other as intended. Although bus subsystem 512 is shown schematically as a single bus, alternative embodiments of the bus subsystem may use multiple busses. For example, RAM-based main memory can communicate directly with file storage systems using Direct Memory Access (DMA) systems.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method implemented on a computer system executing instructions for processing documents, the method comprising:
    processing a document set that contains a plurality of documents to identify a collection of chunks in the documents and to generate corresponding annotations for the chunks; wherein the chunks comprise ranges of characters, tokens and/or non-text objects from the documents; the collection of chunks include chunks that reflect a layout, structure and/or formatting of documents (structure chunks) and chunks that reflect semantic roles played within the documents (semantically-significant chunks); and the annotations for the chunks comprise locations of the chunks within the documents, and semantic role labels for the semantic roles played by the semantically-significant chunks within the documents;
    arbitrating among the chunks in the collection to produce hierarchies of chunks representing individual documents, the hierarchies comprising both structure chunks and semantically-significant chunks, wherein arbitrating among the chunks in the collection comprises modifying the collection of chunks based on their semantic role labels to reduce partial overlap of semantically-significant chunks within the hierarchies; and
    generating representations of the processed documents in a format comprising the hierarchies of chunks and corresponding annotations for the chunks; and
    making the representations in the format available for use by any of a plurality of software applications in downstream processes.

2. The computer-implemented method of claim 1 wherein:
    the layout, structure and/or formatting reflected by the structure chunks include at least some of: chapters, sections, paragraphs, headings, tables, table cells, figures, images, and sidebars; and
    the semantic roles played by the semantically-significant chunks include at least some of: buyer, seller, tenant, agent, patient, doctor, periodic payment amount, principal amount, interest amount, penalty amount, bonus amount, start date, end date, arrival time, and departure time.

3. The computer-implemented method of claim 1 wherein modifying the collection of chunks comprises deleting at least some semantically-significant chunks that have partial overlap with other semantically-significant chunks.

4. The computer-implemented method of claim 1 wherein modifying the collection of chunks comprises modifying at least some semantically-significant chunks that have partial overlap with other semantically-significant chunks.

5. The computer-implemented method of claim 1 wherein modifying the collection of chunks comprises merging at least some semantically-significant chunks that are partially overlapping.

6. The computer-implemented method of claim 1 wherein the annotations for the chunks further comprise confidence levels for the semantic role labels for at least some of the semantically-significant chunks, and modifying the collection of chunks comprises modifying the confidence levels for at least some semantically-significant chunks.

7. The computer-implemented method of claim 6 wherein modifying the collection of chunks comprises resolving two or more consistent semantically-significant chunks into a single semantically-significant chunk with a higher confidence level.

8. The computer-implemented method of claim 6 wherein modifying the collection of chunks comprises resolving two or more contradictory semantically-significant chunks into a single semantically-significant chunk with a lower confidence level.

9. The computer-implemented method of claim 1 wherein the annotations for the chunks further comprise confidence levels for the semantic role labels for at least some of the semantically-significant chunks, and modifying the collection of chunks is further based on the confidence levels for the semantic role labels.

10. The computer-implemented method of claim 1 wherein the annotations for the chunks further comprise a datatype for the chunk, and modifying the collection of chunks is further based on the a priori probability of a given datatype for a particular chunk.

11. The computer-implemented method of claim 1 wherein modifying the collection of chunks is further based on a content of the chunks.

12. The computer-implemented method of claim 1 wherein modifying the collection of chunks is further based on hyponymy between semantic role labels for the chunks.

13. The computer-implemented method of claim 1 wherein modifying the collection of chunks is further based on conditional probabilities of occurrence of a given semantic role label for a context for a particular chunk.

14. The computer-implemented method of claim 1 wherein modifying the collection of chunks is further based on a number, semantic role labels and distribution of semantically-significant chunks across multiple documents in the document set.

15. The computer-implemented method of claim 1 wherein modifying the collection of chunks is further based on requirements of the software applications in downstream processes.

16. The computer-implemented method of claim 1 wherein modifying the collection of chunks is further based on human feedback about semantic role labels in other documents in the document set.

17. The computer-implemented method of claim 1 wherein the annotations for the chunks comprise provenance information for the semantic role labels for at least some of the semantically-significant chunks.

18. The computer-implemented method of claim 1 wherein modifying the collection of chunks reduces a number of redundant, uncertain, conflicting, and partially overlapping semantically-significant chunks.

19. The computer-implemented method of claim 1 wherein the hierarchies of chunks are strictly hierarchical and well-formed without any partial overlap of chunks.

20. The computer-implemented method of claim 1 wherein the hierarchies of chunks include some partial overlap of semantically-significant chunks.

\* \* \* \* \*